April 24, 1956 — L. A. OHLINGER ET AL — 2,743,225
REACTOR
Filed Aug. 27, 1946 — 4 Sheets-Sheet 1

Witnesses:
Herbert E. Metcalf
Walter L. Schlegel, Jr.

Inventors:
Eugene P. Wigner
Alvin M. Weinberg
Gale J. Young
Leo A. Ohlinger
Robert A. Saunders
Attorney Inventors:
Eugene P. Wigner
Alvin M. Weinberg
Gale J. Young
Leo A. Ohlinger

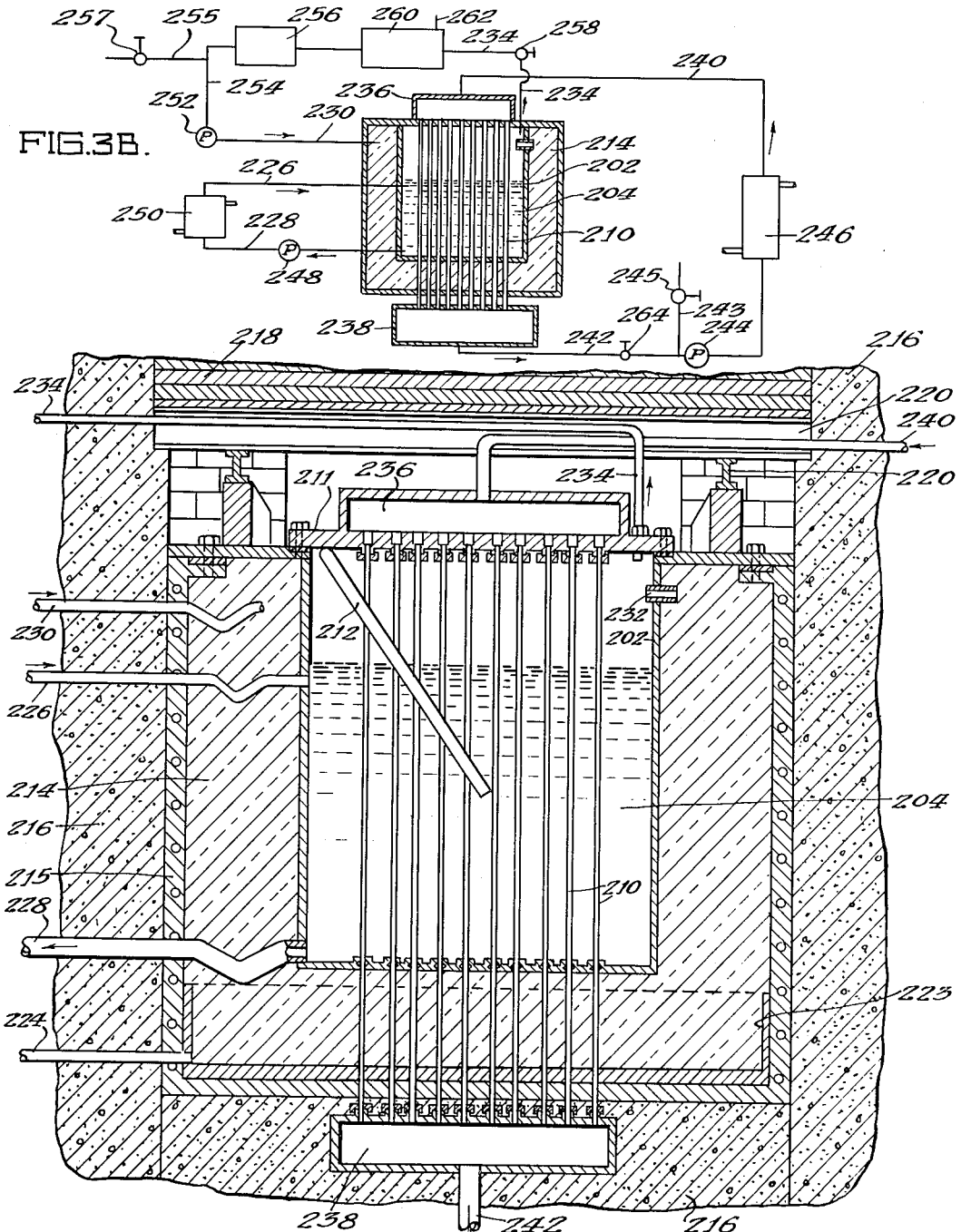

April 24, 1956. L. A. OHLINGER ET AL 2,743,225
REACTOR
Filed Aug. 27, 1946 4 Sheets-Sheet 4

Witnesses:
Hubert E. Metcalf
Walter L. Schlegel, Jr.

Inventors:
Eugene P. Wigner
Alvin M. Weinberg
Gale J. Young
Leo A. Ohlinger
By: Robert A. Lavender
Attorney

# United States Patent Office 2,743,225
Patented Apr. 24, 1956

2,743,225
REACTOR

Leo A. Ohlinger, Chicago, Ill., Eugene P. Wigner, Princeton, N. J., and Gale J. Young and Alvin M. Weinberg, Oak Ridge, Tenn., assignors to the United States of America as represented by the United States Atomic Energy Commission Application August 27, 1946, Serial No. 693,330

3 Claims. (Cl. 204—193)

This invention relates to the general subject of nuclear fission, and more particularly to a novel method and means for sustaining a nuclear fission chain reaction in a system wherein the reactive composition is at least partially liquid and under pressure.

In a neutronic reactor, a neutron fissionable isotope such as $U^{233}$, $U^{235}$ or $94^{239}$ or mixtures thereof is subjected to fission by absorption of neutrons, and a self-sustaining chain reaction is established by the neutrons evolved by the fission. In general such reactors comprise bodies of composition containing such fissionable material, for example, natural uranium disposed in a neutron slowing material which slows the nuetrons to thermal energies at which they are most efficient to produce fission. Such a slowing material is termed a neutron moderator and is preferably formed of a substance having the characteristics of relatively small neutron capture cross-section and relatively great scattering cross section. Heat evolved during the reaction is generally removed by passage of a coolant through the reactor or in heat exchange relationship therewith or by converting the heat to mechanical energy through the use of a heat engine such as a steam turbine. Specific details of the theory and essential characteristics of such reactors are set forth in copending application of Enrico Fermi and Leo Szilard, Serial Number 568,904, filed December 19, 1944, now Patent No. 2,708,656, dated May 17, 1955.

As stated, the present invention relates to a neutronic reaction system wherein the reactive composition is at least partially liquid. In homogeneous reactors of this type the uranium-containing material is dissolved in a liquid moderator as, for example, solutions of $UO_2F_2$, and $UO_2SO_4$ in heavy water ($D_2O$); or the uranium-containing material is suspended within a moderator liquid in the form of a colloid or slurry. In heterogeneous reactors of the type under consideration, the uranium-containing material is aggregated in the form of rods or slugs supported within the moderator liquid.

An object of the invention is to provide a system of the above described type wherein the moderator liquid is subjected to pressure, thereby permitting higher temperatures without boiling and also facilitating emergency draining of the liquid through a dump valve under emergency conditions wherein it is desired quickly to stop the reaction. It will be understood that boiling of the liquid moderator reduces the density thereof and thus increases the critical size of the reactor or, in other words, reduces the neutron reproduction ratio thereof, an undesirable condition which is preferably avoided by operating the reactor at temperatures lower than the boiling point of the liquid moderator.

Another advantage in operating the reactor under pressure is the equalization of pressures within conduits which may extend through the reactor to afford passage of liquid therethrough in heat exchange relationship therewith. It is frequently desirable to place the liquid within the conduits under considerable pressure in increasing velocity of the liquid or to raise the boiling temperature of the liquid, and this pressure tends to overstress the conduits which are formed of relatively thin material to reduce neutron absorption to a minimum.

Another object of the invention is to provide a reflector of neutron scattering or moderating substance disposed around the reactive composition which is under a pressure substantially equal to that of the active portion, said reflector minimizing escape of neutrons as is more fully discussed in said copending application. By thus reducing neutron losses, a relatively compact active portion of the reactor may be designed which is operative to develop a nuclear fission chain reaction even though it is smaller than the critical size at which a reaction would be sustained otherwise. It will be understood that by such a construction considerable quantities of valuable materials may be conserved.

A more specific object of the invention is to equalize the pressure within and without the active portion container of a neutronic reactor by a charge of pressure gas within the container and in a reflector chamber which is disposed around the container, the container having walls of relatively thin neutron pervious material such as aluminum, the neutron capture cross-section of which is relatively small.

Another object of the invention is to provide a novel method and means for operating under pressure an isotope conversion system comprising a chain reacting composition and a bombarded composition spaced therefrom by a neutron permeable wall and capable of undergoing nuclear reaction productive of thermally fissionable material.

It has been determined that in a neutronic reactor comprising a liquid reactive composition such as a slurry or solution of uranium-containing material in heavy water, the use of a neutron reflector such as graphite within the reactor chamber is impractical inasmuch as the reactive composition tends to seep into the reflector and become entrapped therein causing localized areas of intense radioactivity. Obviously a liquid reflector would dilute the reactive composition and could thus not be used within the reactor chamber in a system of his type. According to the present invention, this problem has been solved by providing a reflector of either liquid or porous material around the reactor tank which is formed of relatively thin material to minimize neutron absorption thereby. In order to prevent distortion and consequent damage to the tank, the chamber therearound which contains the neutron reflector is charged with gas under pressure substantially equal to that within the reactor chamber.

It may be noted that in heterogeneous reactors comprising liquid moderator and aluminum sheathed bodies of fissionable material supported therein, a sufficient volume of moderator liquid may, if desired, be provided within the reactor tank to provide a reflector area around the central portion of the tank in which the bodies of fissionable material are disposed, thereby dispensing with a reflector chamber disposed externally of the reactor tank as above described. However, the present invention is of considerable advantage even when applied to a heterogeneous reactor because a solid moderator such as graphite may be used in a system wherein a reflector chamber is disposed around the reactor tank externally thereof. Inasmuch as graphite is much less expensive than heavy water, the most practical reflector liquid known at present, the use of the instant invention in a reactor of the heterogeneous type results in a particularly economical construction, and it is accordingly another object of the invention to provide a heterogeneous neutron reactor of relatively inexpensive design and capable of operating under pressures substantially greater than that of atmosphere.

Other objects and advantages are apparent from the following description taken with the accompanying drawings, in which Fig. 1 is a flow diagram illustrating one embodiment of the invention;

Fig. 3 is a sectional view through a heterogeneous reactor constructed in accordance with the invention;

Fig. 3B is a flow diagram illustrating the reactor of Fig. 3 in combination with systems for cooling the same and for maintaining the same under pressure.

Figure 1:
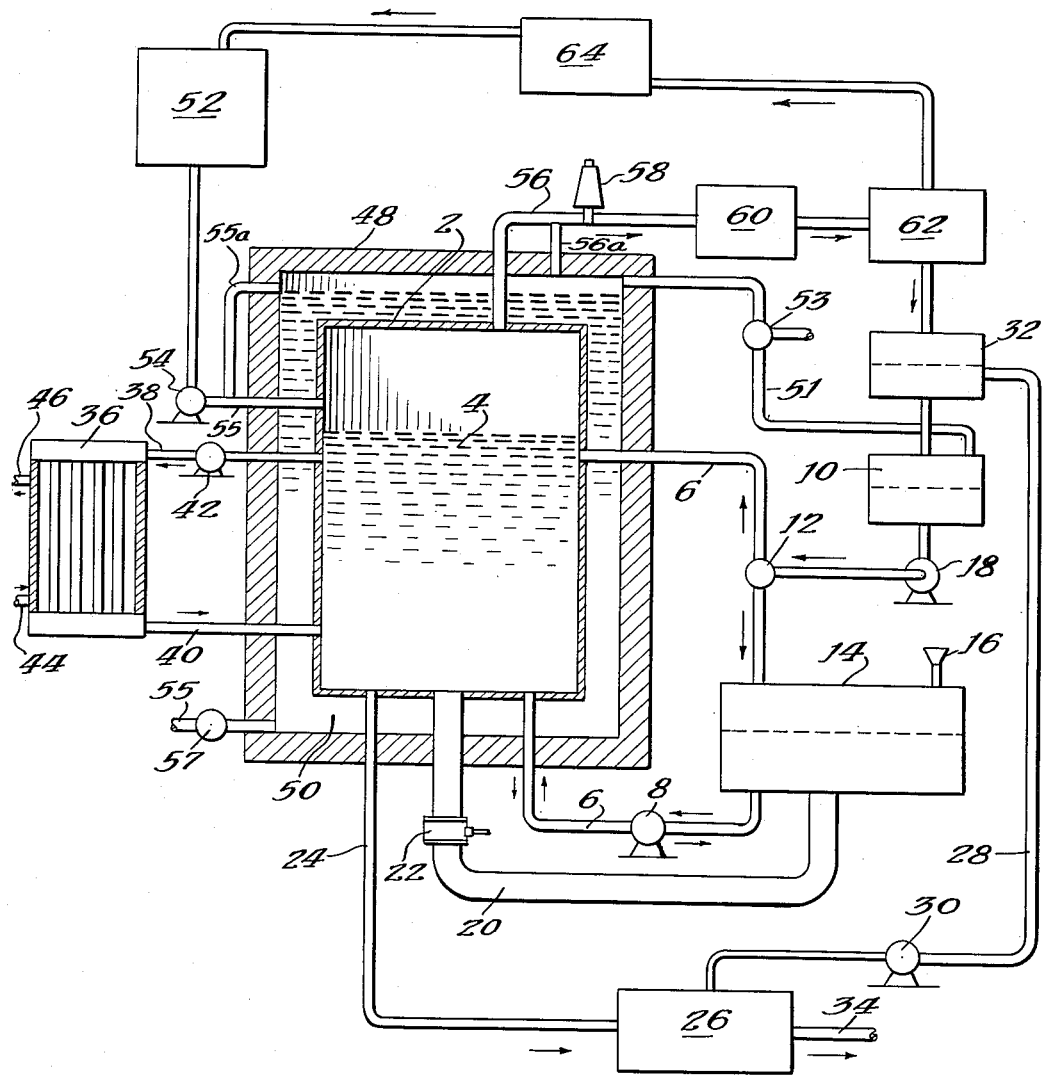

Describing the invention in detail and referring first to Fig. 1, the system illustrated therein comprises a reactor tank or chamber 2 containing a body 4 of fluid reactive composition preferably in the form of a slurry or colloid of uranium-containing material such as $UO_2$, $UO_3$ or $U_3O_8$ and a liquid moderator such as deuterium oxide ($D_2O$) commonly known as heavy water. The volume of slurry as well as the concentration of uranium-containing material therein is regulated by a circulating system including a pipe line 6, a reversible delivery pump 8, a heavy water reservoir 10 connected to the line 6 through a three way valve 12, and a slurry reservoir 14 having an inlet 16 for the reception of uranium-containing material. A pump 18 is provided for delivering moderator fluid to the line 6 from the reservoir 10.

An emergency dump line 20 is connected to the slurry reservoir 14 and to the bottom of reactor tank 2 through a dump valve 22 which may be opened under emergency conditions to quickly reduce the body of slurry within the tank 2 below the critical size at which a nuclear fission chain reaction is sustained.

Slurry within the reactor tank 2 is continuously withdrawn through a line 24 connected to a separating device 26 for separating the uranium-containing material from the moderator fluid which is pumped through a line 28 by a pump 30 into a purification tank 32 from which the purified moderator fluid is conveyed to the reservoir tank 10. The uranium-containing solids in the separator device 26 are conveyed therefrom by a line 34 and are thereafter treated to recover the fission products and $94^{239}$ formed within the reactor 4.

The slurry is cooled by a heat exchanger 36 having inlet and outlet pipes 38 and 40, respectively, connected to the tank 2, a pump 42 being connected to the inlet line 38 to circulate the slurry through the heat exchanger 36. Coolant is passed through the heat exchanger 36 by means of inlet and outlet pipes 44 and 46, respectively.

A pressure tank or chamber 48 encloses the reactor tank 2 and contains a body of liquid neutron moderator fluid such as heavy water which envelops the tank 2 to provide a neutron scattering reflector 50 therearound, said reflector being effective to reduce neutron losses from the periphery of the neutronic reactor 4 within the tank 2, thereby reducing the size at which said reactor is capable of sustaining a chain reaction. The reactor tank 2 is supported in tank 48 by any desired means (not shown).

Moderator fluid may be conveyed to the chamber 48 by a heavy water supply line 51 having a three-way control valve 53 connected to the chamber 48 and the beforementioned reservoir 10 for admitting heavy water thereto whenever it is desired to fill either or both of these vessels. The moderator fluid may be drained from the pressure chamber 48 by an outlet pipe 55 equipped with a conventional drain valve 57.

In the embodiment of the invention illustrated in Fig. 1, pressure is applied to the chambers 2 and 48 by means of a helium circulating system which also functions to sweep away and recombine oxygen and deuterium formed within the reactor tank 2 as a result of decomposition of deuterium oxide in the slurry 4. This circulating system includes a helium reservoir 52 connected to the suction side of a pump 54, the discharge side of which is connected to the reactor tank 2 and chamber 48 by pipes 55 and 55a, respectively. Helium outlet pipes 56 and 56a are connected to the reactor tank 2 and chamber 48, respectively, and are also connected through an adjustable restriction valve 58 to a recombination device 60 comprising any conventional means for heating and recombining the deuterium and oxygen to form gaseous deuterium oxide which is then condensed in a condenser 62 and conveyed to the purification tank 32. Helium is conveyed from the condenser 62 to a helium purification tank 64 and thence to the helium reservoir tank 52.

Since the pressure chamber 48 and the reactor tank 2 are connected to the helium outlet pipes 56 and 56a, it will be understood that, by adjustment of the valve 58, any desired predetermined pressure within the capacity of the pump 54 may be built up within the chambers 2 and 48, which will be the same in both chambers. It may be noted that the walls of the chamber 48 are sufficiently thick to withstand the desired pressure therewithin, said pressure being equal to that within the reactor tank 2, thereby preventing distortion and destruction thereof, the walls of said reactor tank 2 constituting a relatively thin, fluid-tight partition of neutron pervious material, such as aluminum, between the reflector 50 and the reactor 4.

Figure 2:
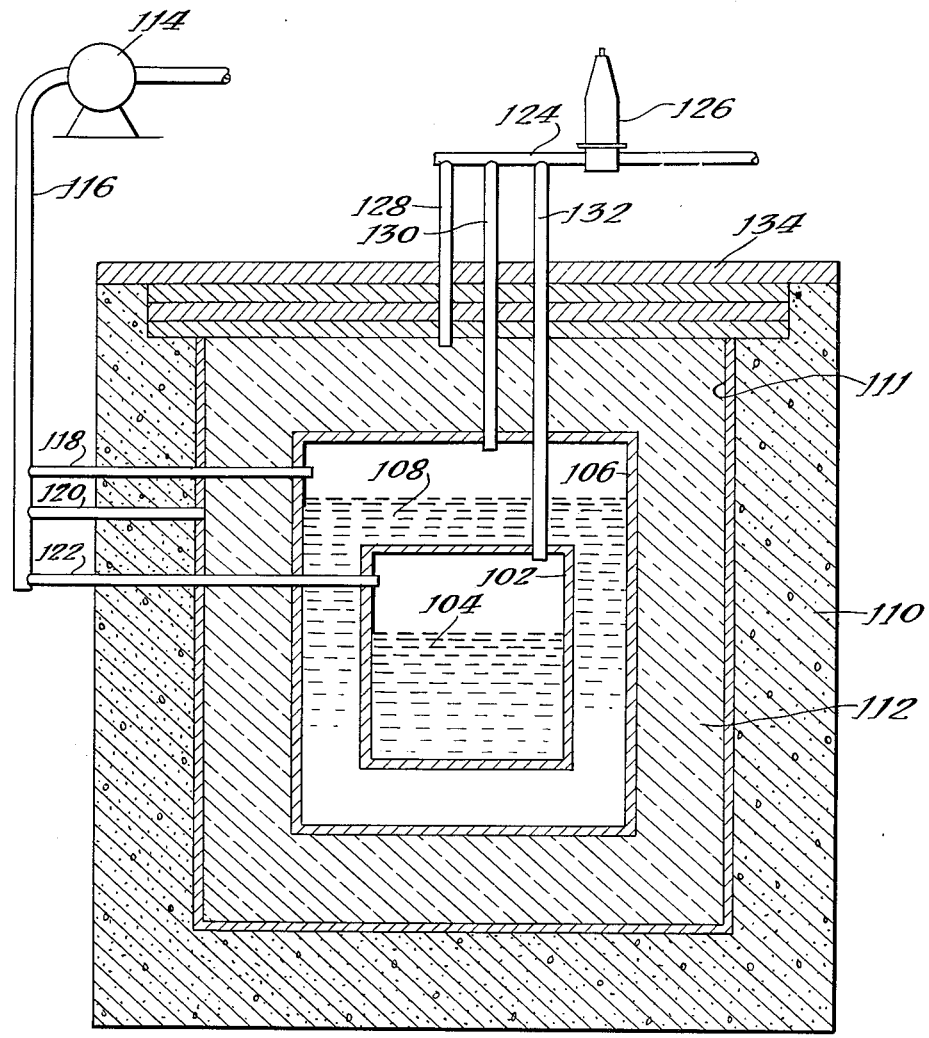
Fig. 2 is a fragmentary diagram illustrating a modification of the system shown in Fig. 1.

Referring now to Fig. 2 which illustrates a modification of the embodiment shown in Fig. 1, the reactor tank or chamber 102 contains a body of reactive composition such as slurry constituting a reactor 104, the walls of the tank 102 being relatively thin to minimize neutron absorption. The tank 102 is supported by any desired means (not shown) within a thin walled reflector tank or chamber 106 which contains a liquid neutron moderator constituting a neutron scattering reflector 108 around the reactor 104. Both tanks 102 and 106 are disposed within a pressure chamber or tank 110 having a gas impervious metal lining 111 and containing a reflector 112 of neutron moderator material such as porous graphite blocks surrounding the tank 106.

If desired, the heavy water reflector 108 may contain in suspension or solution a quantity of material adapted to undergo nuclear reaction under neutron bombardment to produce thermally fissionable material. For example, the heavy water may contain thorium in any form such as the carbonate, the fluoride, or the peroxide thereof. Thus a solution of thorium nitrate or carbonate or a slurry of thorium peroxide powder in heavy water may be disposed within the chamber 106. Bombardment of the thorium atoms by neutrons emanating from the reactor 104 is effective to produce $U^{233}$ in accordance with the following isotope sequence:

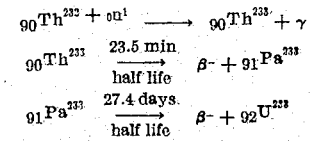

Another element which may be disposed in the heavy water within chamber 106 to produce thermally fissionable material by neutron bombardment is the uranium isotope $U^{238}$ which may, for example, be slurried in the heavy water 108 in the form of uranium oxide powder. Bombardment of the $U^{238}$ atoms by fast neutrons causes nuclear reaction productive of thermally fissionable $Pu^{239}$ in accordance with the following isotope sequence:

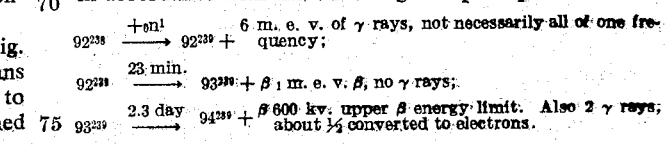

It may be noted in this connection that uranium which has been utilized in a thermal nuclear fission chain reaction and is thus depleted with respect to the thermally fissionable isotopes $U^{233}$ and $U^{235}$ may be enriched with respect to the fissionable content thereof by subjecting the $U^{238}$ atoms to neutron bombardment as above described.

Pressure is developed within the tanks 102, 106, and 110 by a helium circulating system similar to that shown in Fig. 1. This system comprises a pump 114 having its suction side connected to a reservoir not shown. The discharge side of the pump 114 is connected to an inlet line 116 having three branches, 118, 120 and 122 connected, respectively, into chambers 106, 110 and 102. A helium outlet line 124 having an adjustable restriction valve 126 is connected by three branch lines 128, 130 and 132 to the chambers 110, 106 and 102, respectively, said branch lines extending through a lead shield or cover 134 on the pressure tank 110. The outlet line 124 is connected to a device (not shown) for recombining deuterium and oxygen as in the previously described embodiment. By adjustment of the valve 126, any desired predetermined pressure within the capacity of pump 114 may be built up within the three chambers.

It will be understood that the system fragmentarily shown in Fig. 2 is substantially the same as that shown in Fig. 1 except for the details shown and described.

Figure 3A:
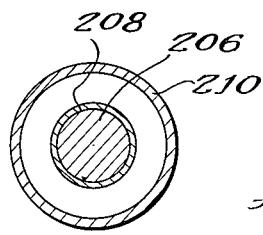
Fig. 3A is a sectional view through one of the aluminum sheathed uranium rods shown in Fig. 3.

Referring now to Figures 3, 3A, and 3B, the invention is illustrated as applied to a heterogeneous reactor disposed within a reactor tank or chamber 202. The reactor comprises a body of moderator liquid 204 and a plurality of uranium rods or slugs, one of which is shown at 206 (Fig. 3A), each rod being enclosed within an aluminum sheath 208 which is supported within an aluminum conduit or tube 210 adapted to convey cooling fluid circulated therethrough by any conventional system shown in Fig. 3B. The conduits 210 and the uranium rods 206 therein are supported from a steel cover 211 on the reactor tank 202. The conduits 210 are connected at the top and bottom thereof to inlet and outlet header chambers 236 and 238, respectively, the inlet chamber being connected to an inlet line 240 and the outlet chamber being connected to an outlet line 242.

A control rod 212 of neutron absorbent material such as cadmium is supported within the tank 202 and is adapted to be raised or lowered therein by actuating means (not shown) for the purpose of controlling the neutron density within the reactor as more fully discussed in the above-mentioned copending application.

The tank 202 is disposed within a porous reflector 214 preferably composed of graphite blocks and said reflector is in turn contained within a pressure tank in the form of a pressure tight shield 215 formed of lead or other material particularly adapted to absorb emanations from the reactor. Surrounding the shield 215 is a chamber or vault 216 preferably formed of concrete, and the top of the vault is closed by a biological shield or cover 218 adapted to absorb emanations from the reactor, said shield being preferably composed of alternate layers of iron and "Masonite" and being afforded support by I beams 220.

A drip pan 223 is provided beneath the tank 202 to recover any moderator fluid which may leak therefrom, and a drain pipe 224 is connected to the pan 223.

The moderator fluid 204 is circulated through the tank 202, as hereinafter described, by inlet and outlet pipes 226 and 228, respectively; and helium under pressure is conveyed to a point internally of the reflector 214 by one or more pipes 230, some of said helium passing into the reactor tank 202 through one or more conduits 232 in the wall thereof and out through an outlet pipe 234.

Referring now to Fig. 3B, it will be seen that the coolant outlet line 242 is connected to the suction side of a pump 244, the discharge side of which is connected to a conventional heat exchanger 246. A coolant make-up line 243 is connected through a conventional shut-off valve 245 to the line 242 at the suction side of pump 244. The coolant passes from the outlet side of the heat exchanger 246 into the before-mentioned inlet coolant line 240 and thence into the inlet header chamber 236. By means of this system, the coolant flowing through the conduits 210 passes in heat exchange relationship with the uranium rods 206 to absorb the heat of the nuclear fission chain reaction. The coolant is then pumped through the heat exchanger 246 adapted to reduce the temperature of the coolant to a predetermined value and the coolant is then recirculated through the conduits 210.

Auxiliary cooling means are provided in the form of a pump 248 in the moderator outlet line 228, said pump having its suction side connected to the tank 202, and said pump having its discharge side connected to a conventional heat exchanger 250. The outlet side of the exchanger 250 is connected to the moderator inlet line 226, which as above noted is connected to the tank 202 adjacent the upper extremity thereof.

The helium pressure system, as shown in Fig. 3B, comprises the before-mentioned helium inlet line 230, which connects the discharge side of a pump 252 to the interior of the chamber 215, the suction side of pump 252 being connected by a pipe or line 254 to a conventional purifier 256 adapted to remove radioactive fission products from the helium passing therethrough. A helium make-up line 255 comprising a conventional shutoff valve 257 is connected to the line 254 at the suction side of the pump 252. The helium is conveyed from the top of the tank 202 through the before-mentioned helium outlet line 234, which is equipped with a conventional adjustable restriction valve 258 adapted to maintain a predetermined pressure within the tank 202 by restricting the flow of helium therefrom. The line 234 is connected to a conventional recombiner 260 adapted to recombine the disassociated $D_2$ and $O_2$ swept from the tank 202 and $D_2O$, which is conveyed from the recombiner 260 by a pipe 262. The helium passes from the recombiner 260 into the before-mentioned purifier 256 and thence through the line 254 to the suction side of the pump 252.

It will be understood that by maintaining the heavy water moderator 204 under pressure, the reactor is capable of operating at relatively high temperatures without boiling the moderator and thus reducing the neutron reproduction ratio of the system. The pressure on the moderator 204 is substantially equalized by that within the tubes 210, inasmuch as the coolant outlet line 242 is equipped with an adjustable restriction valve 264 of conventional form adapted to maintain a predetermined pressure within the tubes 210 by resisting the flow of coolant from the outlet header chamber 238. Furthermore, the pressures on the moderator 204 and the coolant flowing through the tubes 210 are equalized by the pressure within the reflector 214 disposed externally of the tank 202. This permits the use of relatively thin tubes 210 and a relatively thin walled tank 202, thus reducing neutron absorption within the system and increasing the neutron reproduction ratio thereof.

Figure 4:
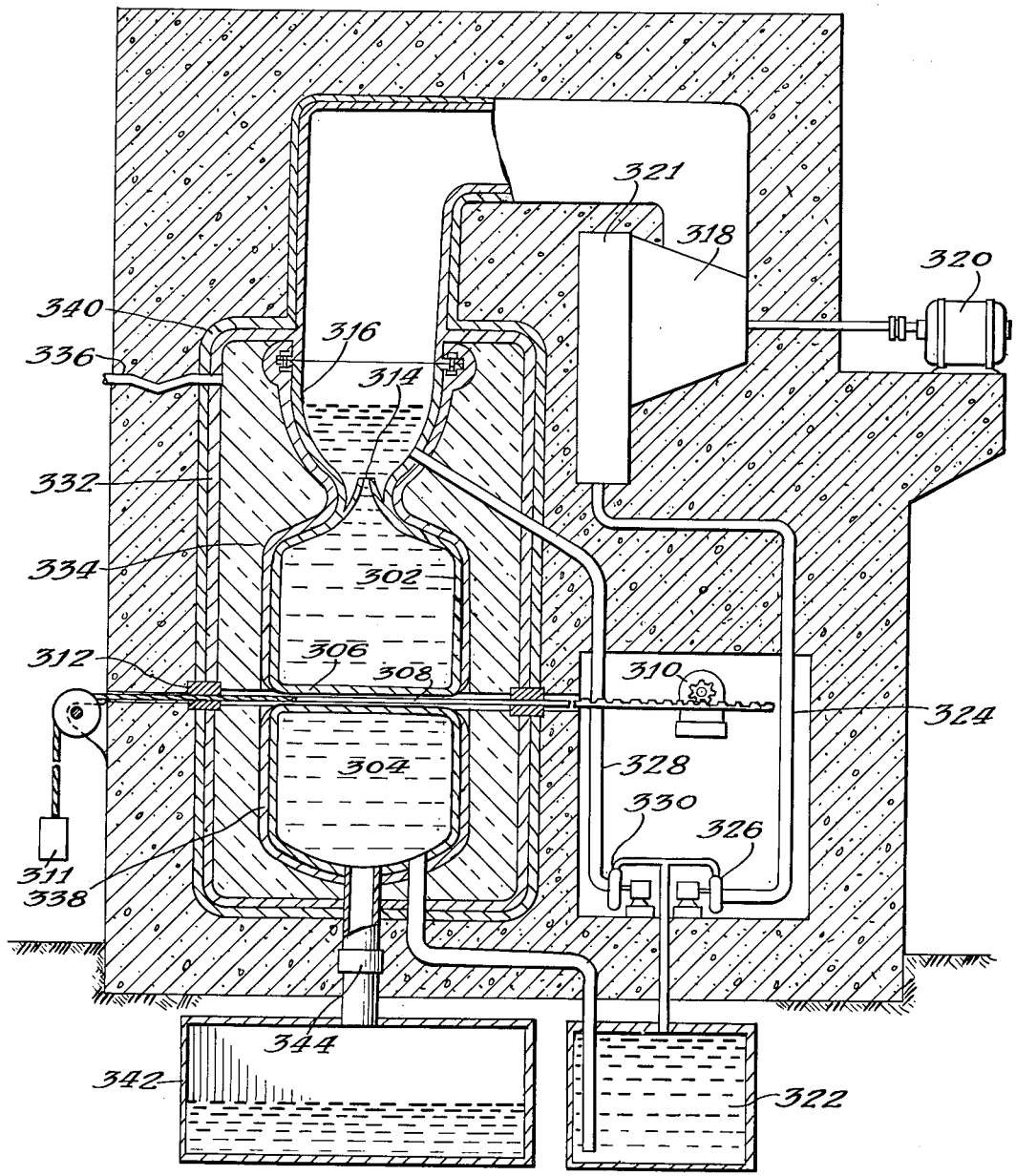
Fig. 4 is a sectional view through a homogeneous reactor constructed in accordance with the invention and particularly designed for the operation of a heat engine such as a steam turbine.

Referring now to Fig. 4, a modification of the invention is shown wherein the reactor is designed for the purpose of operating a heat engine such as a turbine by steam flashed off from the reactive composition.

The reactor tank 302 contains a reactor 304 in the form of a body of liquid composition such as a slurry or solution of uranium-containing material in a liquid neutron moderator such as heavy water. The tank 302 is formed with a central passage 306 for the reception of a control rod 308 adapted to be inserted to various depths within the passage by a rack and pinion mechanism 310 connected to operating means (not shown). The rod 308 is connected to a weight 311, which is operable to pull the rod to its innermost position against the stop 312 in the event that the actuating means for the rod fails to function.

The upper end of the tank 302 is formed with an orifice 314 through which the reactive composition 304 is forced under pressure into an expansion chamber 316, wherein steam is flashed off, during expansion of the heated composition, to operate a steam turbine 318 operatively connected to an electric generator 320. A condenser 321 is associated with the turbine for condensing the steam and returning it to a reservoir 322 by means of a pipe line 324 including a pump 326.

The reactive composition within the expansion chamber is conveyed through a pipe line 328 including a pump 330 into the reservoir 322 from which it is forced into the reactor tank 302. It may be noted that because of the restricted orifice 314, the reactive composition 304 within the tank 302 is maintained at a relatively high pressure, such as, for example, 225 lbs. per square inch. To equalize this pressure and thereby prevent distortion of tank 302, a reflector or pressure chamber 332 is provided containing a neutron reflector 334 of porous moderator material, such as carbon blocks, and a charge of helium under pressure is admitted to the chamber 332 by a helium line 336.

The tank 302 is provided with an external heat insulation shield 338, and the pressure chamber as well as the expansion chamber is provided with an external shield 340 of lead or other material particularly adapted to absorb emanations from the reactor. An emergency dump reservoir 342 communicates with the bottom of the tank 302 through a dump valve 344 operable under emergency conditions by control means (not shown) to dump sufficient quantity of the reactive composition 304 into the reservoir 342 to reduce the neutron reproduction ratio of the reactor below unity, thereby stopping the reaction.

The particular system illustrated in Fig. 4 is not described in further detail inasmuch as it is no part of the present invention except for the provision of the reflector 334 and the charge of helium under pressure therein for equalizing the pressure within the reactor tank 302.

From the foregoing, it will be understood that the invention comprehends a novel method and means for reducing the size at which a neutronic reactor operating under pressure is capable of sustaining a nuclear fission chain reaction by providing a relatively thin reactor tank surrounded by a spaced external reflector shield containing a neutron reflector substance, the chamber so formed being under a pressure substantially equal to that within the reactor tank.

While the theory of nuclear fission mechanism set forth herein is based on the best presently known experimental data, facts later discovered may modify the theory disclosed, and it will also be understood that various embodiments of the invention will be apparent to those skilled in the art without departing from the scope of the invention which is limited solely by the appended claims.

It is claimed:

1. In a neutronic reaction system, a pressure tank, a container therein having an opening in a wall and dividing the interior of said pressure tank into an inner space within said container and an outer closed space between said container and said pressure tank, the walls of said container dividing the tank into two spaces being relatively thin and composed of a material having the characteristics of small neutron capture cross section, uranium and heavy water within the inner space in said container in an amount and disposition to produce a self-sustaining chain reaction, graphite in the outer closed space around said container, a source of helium, means for introducing said helium under pressure to the outer closed space, and means for withdrawing helium under pressure from the inner space, said inner space being free of any connection with said helium-introducing means except by way of the outer closed space.

2. In a neutronic reaction system, a pressure tank, a container therein having an opening in a wall and dividing the interior of said pressure tank into an inner space within said container and an outer closed space between said container and said pressure tank, the walls of said container dividing the tank into two spaces being relatively thin and composed of a material having the characteristics of small neutron capture cross section, uranium rods and heavy water within the inner space in said container in an amount and disposition to produce a self-sustaining chain reaction, graphite in the outer closed space around said container, a source of helium, means for introducing said helium under pressure to the outer closed space, and means for withdrawing helium under pressure from the inner space, said inner space being free of any connection with said helium-introducing means except by way of the outer closed space.

3. In a neutronic reaction system, a pressure tank, a container therein having an opening in a wall and dividing the interior of said pressure tank into an inner space within said container and an outer closed space between said container and said pressure tank, the walls of said container dividing the tank into two spaces being relatively thin and composed of a material having the characteristics of small neutron capture cross section, uranium and heavy water within the inner space in said container in an amount and disposition to produce a self-sustaining chain reaction, heavy water in the outer closed space around said container, a source of helium, means for introducing said helium under pressure to the outer closed space, and means for withdrawing helium under pressure from the inner space, said inner space being free of any connection with said helium-introducing means except by way of the outer closed space.

References Cited in the file of this patent

UNITED STATES PATENTS

| 1,845,135 | Dieter | Feb. 16, 1932 |

FOREIGN PATENTS

| 861,390 | France | Oct. 28, 1940 |
| 233,011 | Switzerland | Oct. 2, 1944 |
| 114,150 | Australia | May 2, 1950 |
| 648,293 | Great Britain | Jan. 3, 1951 |

OTHER REFERENCES

Kelly et al.: Phy. Rev. 73, 1135–9 (1948).

A General Account of the Development of Methods of Using Atomic Energy for Military Purposes Under the Auspices of the U. S. Government 1940–45 by H. D. Smyth, for sale by Supt. of Documents, Washington, D. C. (Aug. 1945), pg. 22.